United States Patent

Todd

[11] Patent Number: 5,090,570
[45] Date of Patent: Feb. 25, 1992

[54] PACKAGE FOR A SMALL FRAGILE ITEM

[76] Inventor: Alvin E. Todd, P.O. Box 924, Pigeon Forge, Tenn. 37868-0924

[21] Appl. No.: 549,606

[22] Filed: Jul. 9, 1990

[51] Int. Cl.⁵ .............. B65D 73/00; B65D 81/02
[52] U.S. Cl. ................. 206/463; 206/470; 206/521; 206/806
[58] Field of Search .............. 206/461–463, 206/467, 470, 806, 521

[56] References Cited

U.S. PATENT DOCUMENTS

| | | | |
|---|---|---|---|
| 3,127,993 | 4/1964 | Phipps | 206/462 X |
| 3,129,817 | 4/1964 | Rohdin | 206/462 |
| 3,298,515 | 1/1967 | Watts, Jr. | 206/462 X |
| 3,861,528 | 1/1975 | Damuth | 206/463 |
| 4,020,694 | 5/1977 | Mayhew | 206/461 X |
| 4,319,684 | 3/1982 | Backman et al. | 206/470 X |
| 4,456,124 | 6/1984 | Kay et al. | 206/463 |
| 4,499,353 | 2/1985 | Shields | 206/470 |
| 4,669,610 | 6/1987 | Lindsey et al. | 206/461 X |
| 4,739,883 | 4/1988 | Mohs et al. | 206/470 |
| 4,779,734 | 10/1988 | Kydonieus | 206/470 |
| 4,804,984 | 2/1989 | Heuer et al. | 206/461 |

*Primary Examiner*—Bryon P. Gehman
*Attorney, Agent, or Firm*—Pitts & Brittian

[57] ABSTRACT

An improved package for protecting fragile item during shipment and subsequent display which allows the item contained therein to be viewed substantially about its perimeter. The package also protects the fragile item from mechanical shock. The package consists of an encapsulating shell member for receiving the fragile item, a board member interconnected with the shell member, a securing feature for securing the shell member to the board member and a shock absorbing feature for protecting the item from breakage due to mechanical shock. The package is reusable and allows for easy replacement of any component damaged during the packing of the item.

2 Claims, 2 Drawing Sheets

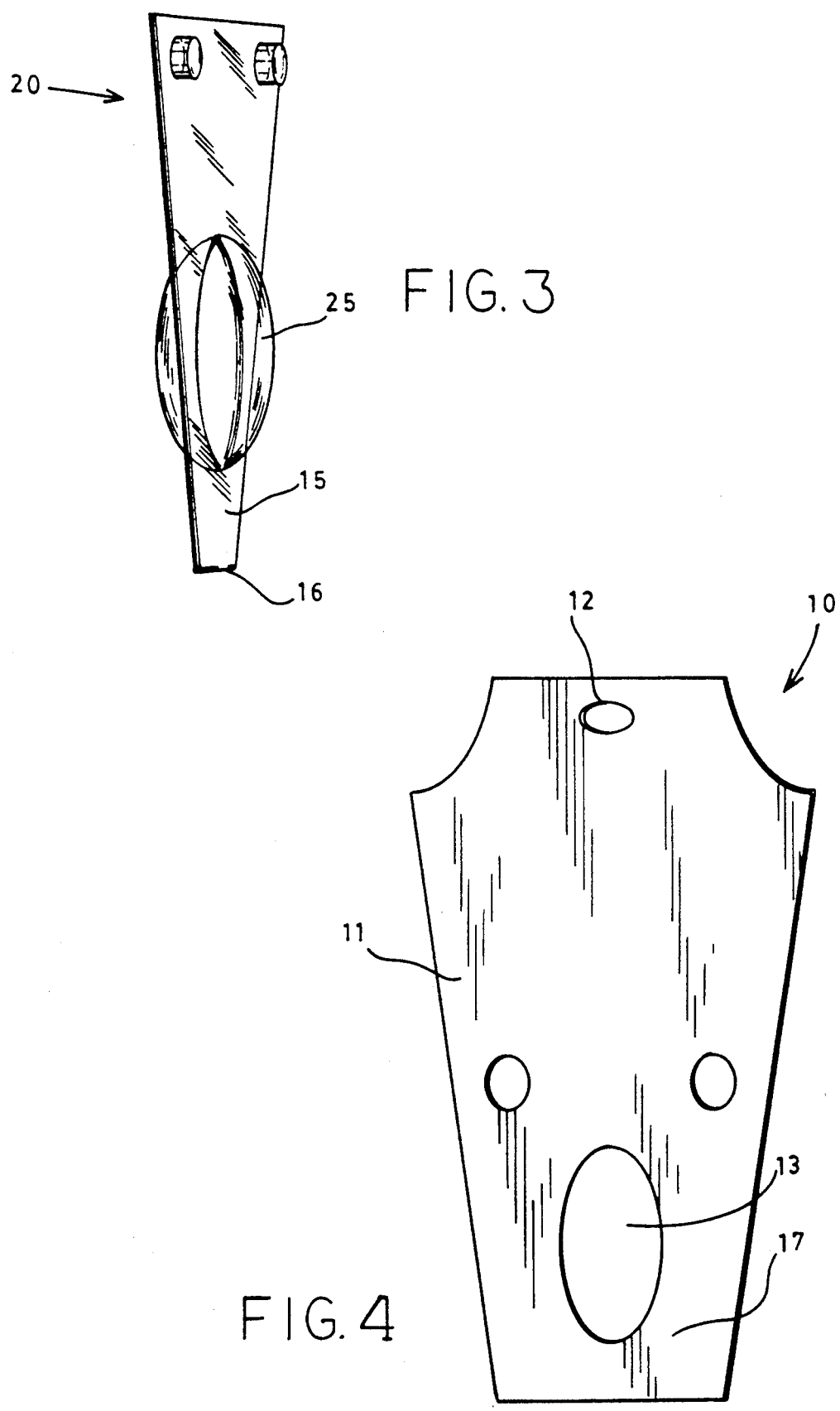

PACKAGE FOR A SMALL FRAGILE ITEM

TECHNICAL FIELD

This invention relates to the field of packaging small items for transportation and subsequent display, more specifically it relates to a package for a small fragile item such as a ceramic ceiling fan pull.

BACKGROUND

Small fragile items are often packaged individually for resale to the consumer. Heretofore these packages have allowed the consumer to view only the front portion of the item contained within the package. Since it is the item that the consumer is interested in purchasing and not the package per se, it is beneficial and desirable to be able to view all sides of the item. Not only does this allow the consumer to determine if the entire item is pleasing in appearance, as many of these small fragile items are decorative in nature, but it also allows the consumer to visually inspect the entire item for surface flaws or breakage.

For the convenience of the retailer these packages are designed to hang from peghooks. Often these packages are dropped by the retail shopper or the retail store clerk. As many of these items are fragile, this results in breakage of the item.

Further, during the process of packaging the item, part of the package may be damaged. With a unitary package that is glued together, this results in the loss of the entire package. This represents a loss of profits for the manufacturer.

Thus it is an object of this invention to provide a package that allows the item contained therein to be viewed substantially about its perimeter.

It is yet another object of this invention to provide a package that cushions fragile items thereby protecting them from mechanical shock due to an inadvertent drop.

Still another object of the present invention is to provide a modular package that is reusable and allows for easy replacement of any component damaged during the packaging of the item.

Other objects and advantages of the present invention will become apparent upon reading the detailed description together with the drawings as described as follows.

DISCLOSURE OF THE INVENTION

In accordance with the various features of this invention, an improved package for protecting a small fragile item during shipment and subsequent display is provided. The package provides an encapsulating shell member for receiving the small fragile item, a board member interconnected with the encapsulating shell member, a securing means for securing the encapsulating shell member to the board and a shock absorbing means for protecting the item from breakage due to mechanical shock that is the result of the package being dropped.

DESCRIPTION OF THE DRAWINGS

FIG. 3 illustrates an elevation view of the encapsulating shell member in the closed position.

FIG. 4 illustrates an elevation view of the board member of the present invention.

BEST MODE FOR CARRYING OUT THE INVENTION

Figure 1:
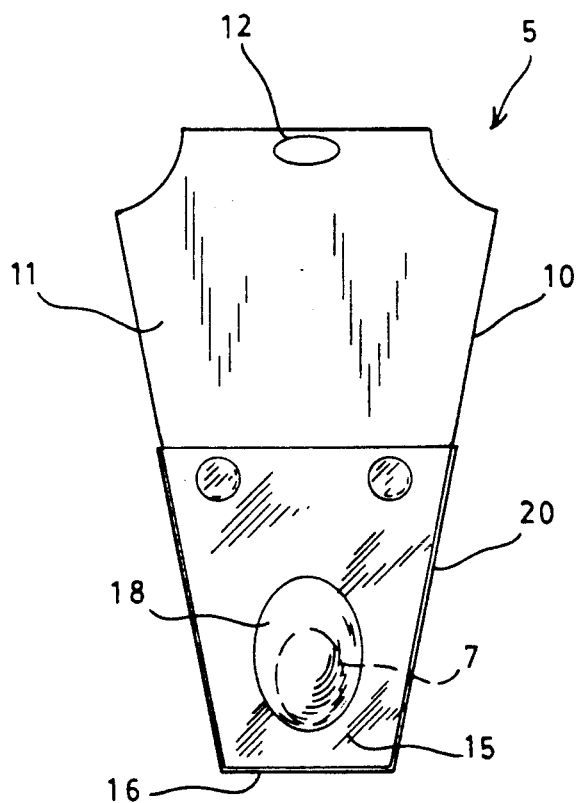
FIG. 1 illustrates an package for protecting a small fragile item during shipment and subsequent display constructed in accordance with various features of the preferred invention.
Figure 2:
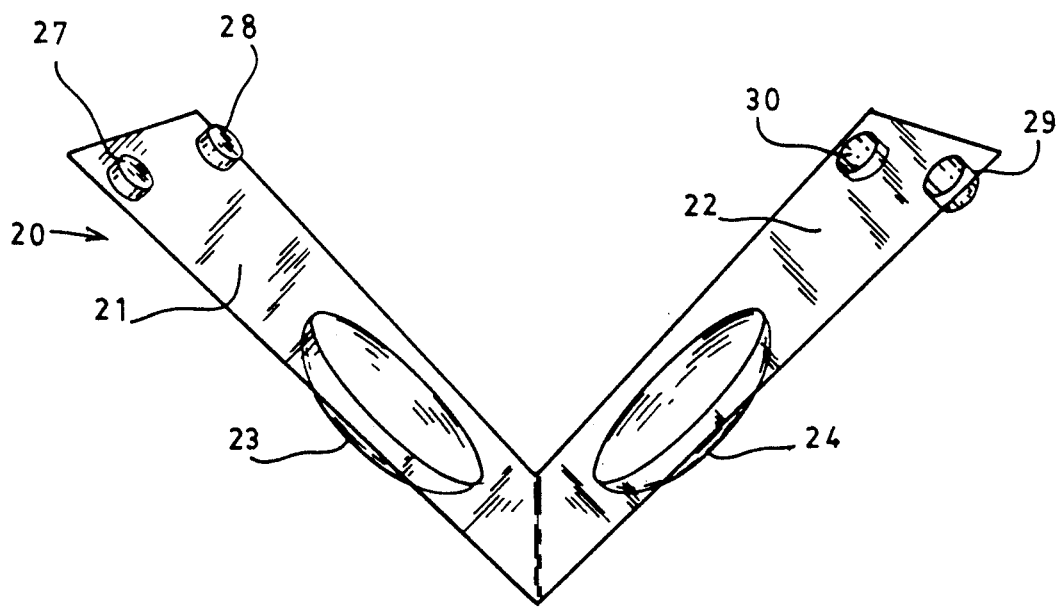
FIG. 2 illustrates an elevation view of the encapsulating shell member in the open position.

An improved package for protecting a small fragile item during shipment and subsequent display constructed in accordance with various features of the present invention is illustrated generally at 5 in FIG. 1. The package 5 comprises an encapsulating shell 20 in FIG. 1, shown generally as 20 in FIGS. 2 and 3, constructed of a semirigid transparent material. The encapsulating shell member 20 is composed of two substantially planar members 21 and 22 in FIG. 2 with concave indentations 23 and 24 in FIG. 2. When the substantially planar members 21 and 22 are moved pivotally in a clamshell motion, the concave indentations 23 and 24 cooperate to define a cavity 25 which encloses the item 7 contained within the package 5. In the preferred embodiment the two substantially planar members 21 and 22 are pivotally connected.

A board member shown generally as 10 in FIG. 4 has an opening 12 which allows the package 5 to be suspended from a display rack and further provides a displaying indicia means 11 to identify the item 7 contained in the package 5. As seen in FIG. 1 and FIG. 4, board member 10 is generally trapezoidally shaped. The encapsulating shell member 20 is detachably secured to the board member 10 and releasably secured in a closed manner by a securing means comprising engaging male 27 and 28 in FIG. 2 and female members 29 and 30 operable in cooperation with each other in a tight frictional engagement.

A shock absorbing means for absorbing mechanical shock and vibration is composed of an extended portion 15 in FIGS. 1 and 3 that extends between said cavity 25 and lower end 16 in FIG. 3 of said package. The shock absorbing means is further composed of the excess volume 18 that results from use of a cavity 25 having a volume that is greater than the volume of the item 7 to be contained within the package 5.

An additional component of the shock absorbing means is an opening 13 in the board member 10 that approximates the cross-sectional area of the item 7 to be received therein, this creates a lower portion 17 in FIG. 4 in the board member 10 that cooperates with the extended portion 15 of the shock absorbing means. This extended portion 15 of the shock absorbing means is the first part of the package to engage the floor when the package 5 is dropped from any appreciable height due to the low center of gravity of the package 5.

From the foregoing description, it will be recognized by those skilled in the art that an improved package for a small fragile item offering advantages over the prior art has been provided. Specifically, the improved package provides a package that allows the item contained therein to be viewed substantially about its perimeter, a package that cushions a small fragile item thereby protecting them from mechanical shock due to an inadvertent drop, and a modular package that is reusable and allows for easy replacement of any component damaged during the packaging of the item.

Though one preferred embodiment has been illustrated and described along with an alternative embodiment, it is of course understood that various modifications thereof will become apparent to those skilled in the art and, accordingly, the scope of the present invention should be defined only by the appended claims and their equivalents thereof.

Having thus described the aforementioned invention, I claim:

1. A package for protecting a small fragile item during shipment and subsequent display; said package comprising:

an encapsulating shell member constructed of a semi-rigid transparent material which allows said small fragile item to be carried in said package to be viewed substantially around its perimeter, said encapsulating shell member having two substantially planar members comprising first and second ends, said second ends being pivotally connected and defining a lower end of said package, said substantially planar members further comprise cooperating concave indentations whereby said concave indentations cooperate to define a cavity which encapsulates said small fragile item to be contained within said package;

a board member having means for suspending said package from a display rack and further having display indicia means to identify said small fragile item to be contained in said package;

a securing means having engaging male and female members on said planar member operable in cooperation with each other in a tight frictional engagement thus detachably securing said package in a releasably closed position; and a shock absorbing means for partially absorbing mechanical shock and vibration having an extended portion of said encapsulating shell member that extends between said cavity and said lower end of said package, and further having said cavity having a volume that is greater than the volume of said item to be contained within said package; said shock absorbing means further having an opening in said board member that approximates the cross-sectional area of said small fragile item to be received therein, said board member having a lower portion that cooperates with said extended portion of said shock absorbing means.

2. A package for protecting a small fragile item during shipment and subsequent display wherein said small fragile item is a ceramic ceiling fan pull, said package comprising:

an encapsulating shell member constructed of a semi-rigid transparent material which allows said small fragile item to be carried in said package to be viewed substantially around its perimeter, said encapsulating shell member having two substantially planar members each having first and second ends, said second ends being pivotally connected and defining a lower end of said package, said substantially planar members further having cooperating concave indentations whereby said concave indentations cooperate to define a cavity to encapsulate said item to be contained within said package;

a generally trapezoidally shaped board member having means for suspending said package from a display rack and further having displaying indicia means to identify said item to be contained in said package;

a securing means having engaging male and female members on said planar members operable in cooperation with each other in a tight frictional engagement thus detachably securing said package in a releasably closed position; and a shock absorbing means for partially absorbing mechanical shock and vibration having an extended portion of said encapsulating shell member that extends between said cavity and said lower end of said package, further having said cavity having a volume that is greater than the volume of said item to be contained within said package and still further having an opening in said board member that approximates the cross-sectional area of the item to be received therein, said board member having a lower portion that cooperates with said extended portion of said encapsulating shell member.

* * * * *